(12) United States Patent
Ishitoya et al.

(10) Patent No.: US 6,894,807 B1
(45) Date of Patent: May 17, 2005

(54) METHOD AND APPARATUS FOR PRINTING A BLACK-AND-WHITE IMAGE BASED ON COLOR IMAGE INFORMATION

(75) Inventors: Mitsuaki Ishitoya, Amimachi (JP); Tadakazu Yokoyama, Amimachi (JP)

(73) Assignee: Riso Kagaku Corporation, Tokyo (JP)

( * ) Notice: Subject to any disclaimer, the term of this patent is extended or adjusted under 35 U.S.C. 154(b) by 961 days.

(21) Appl. No.: 09/603,990

(22) Filed: Jun. 27, 2000

(30) Foreign Application Priority Data

Jun. 28, 1999 (JP) .......................................... 11-181294

(51) Int. Cl.[7] .............................. G06F 15/00; G06K 1/00
(52) U.S. Cl. ......................... 358/1.9; 358/1.9; 358/501; 358/520; 358/505
(58) Field of Search ........................ 358/1.9, 501, 520, 358/505

(56) References Cited

U.S. PATENT DOCUMENTS

| | | | | |
|---|---|---|---|---|
| 4,703,318 A | * | 10/1987 | Haggerty | 345/634 |
| 5,153,576 A | * | 10/1992 | Harrington | 345/596 |
| 5,335,082 A | * | 8/1994 | Sable | 347/232 |
| 5,513,007 A | * | 4/1996 | Ito et al. | 358/296 |
| 5,661,575 A | * | 8/1997 | Yamashita et al. | 358/519 |
| 5,680,230 A | * | 10/1997 | Kaburagi et al. | 358/520 |
| 5,701,401 A | * | 12/1997 | Harrington et al. | 358/1.9 |
| 6,101,271 A | * | 8/2000 | Yamashita et al. | 382/167 |
| 6,204,934 B1 | * | 3/2001 | Minamino | 358/1.9 |

FOREIGN PATENT DOCUMENTS

| | | |
|---|---|---|
| EP | 0 572 325 | 12/1993 |
| EP | 0 860 988 | 8/1998 |

OTHER PUBLICATIONS

Weeks et al., "Histogram Equalization of 24–bit Color Images in the Color Difference (C–Y) Color Space", pp. 15–22, Jan. 1995, Journal of Electronic Imaging, vol. 4, No. 1.

* cited by examiner

*Primary Examiner*—Mark Wallerson
*Assistant Examiner*—Michael Burleson
(74) *Attorney, Agent, or Firm*—Donald R. Studebaker; Nixon Peabody LLP

(57) ABSTRACT

Color image information is converted to black-and-white image information. Based on the converted black-and-white image information, a black-and-white printout is obtained. At least either brightness or saturation is independently controlled for each desired hue, based on a color image signal carrying the color image information. The controlled color image signal is converted to a black-and-white image signal carrying the black-and-white image information, and the black-and-white printout is obtained based on the converted black-and-white image signal.

5 Claims, 3 Drawing Sheets

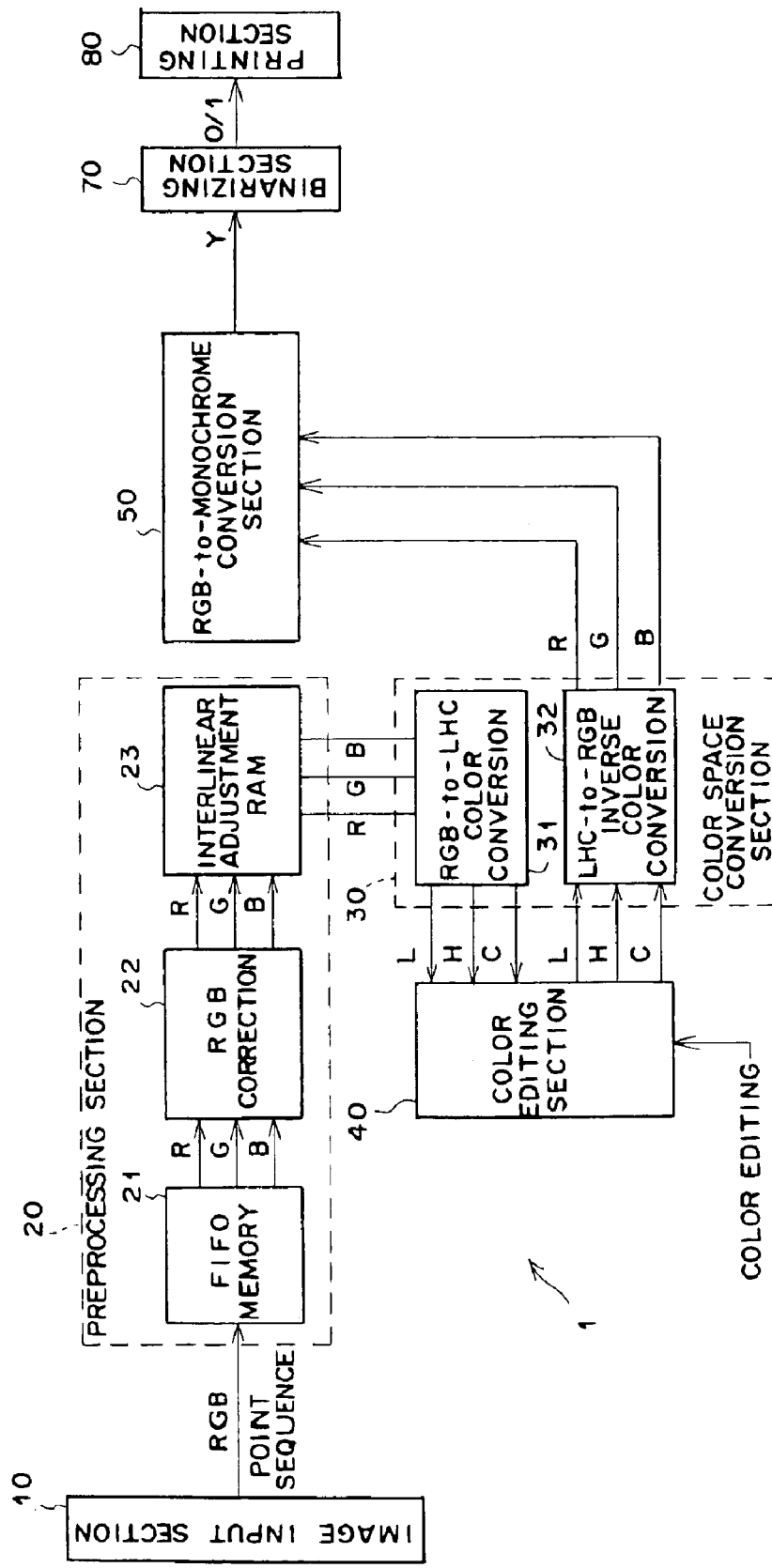
F I G. 1

METHOD AND APPARATUS FOR PRINTING A BLACK-AND-WHITE IMAGE BASED ON COLOR IMAGE INFORMATION

BACKGROUND OF THE INVENTION

1. Field of the Invention

The present invention relates to a method and apparatus for printing a black-and-white image, and more particularly to a method and apparatus which converts color image information to black-and-white image information and then obtains a black-and-white printout, based on the converted black-and white image information.

2. Description of the Related Art

The reduction in prices of scanners and the advent of digital cameras, etc., have recently made it easy to generate image data with a wide variety of image readers. In addition, with the development and broad spread of office equipment, it has become possible to embed a photographic image into a manuscript, such as a document, which is constituted only of characters, tables, line drawings and the like simply represented only as black and white (two values), etc. Furthermore, in photogravure, etc., a net-pointed manuscript is often employed as a manuscript for printing.

Thus, in place of a manuscript simply represented only as black and white, various information has recently been transmitted by one manuscript. Because of this, many of the manuscripts become complicated because they contain black-and-white characters, tables, line drawings, etc., represented mainly by two values, and silver-salt photographs or netted-point images (not limited only to photographic portions) which can represent a halftone, and consequently, the construction of a manuscript to be printed has become increasingly complicated.

In the case where a black-and-white image is printed by a copying machine, printer, or stencil printer, etc., there is a need to obtain a black-and-white print, by (1) reading a manuscript, in which characters, photographs, netted points, etc., are present together, with a monochrome scanner, (2) obtaining a multi-level image signal carrying black-and-white image information sampled in the unit of a pixel in horizontal and vertical scanning directions, (3) binarizing this multi-level image signal, and (4) obtaining binary output, based on the binarized image data.

When binarizing a multi-level image signal, a simple binarizing method, in which binarization is performed with a single threshold value as a basis, is generally employed in a manuscript constituted of characters, line drawings, etc. For a manuscript consisting of a photograph with a halftone, a binarizing method, such as a pseudo halftone representation method and the like, is employed. As a typical example of this pseudo halftone representation method, a dither method, an error-diffusing method, etc., are known.

The above-mentioned simple binarizing method is a method where a multi-level image signal is scanned in horizontal and vertical scanning directions and each pixel constituted with the multi-level image signal is binarized with a preset threshold value as a basis. The dither method is a method in which pseudo level representation is performed on recording paper, by fluctuating a threshold value by the use of a particular pattern in order to generate a dither matrix, scanning a multi-level image signal of this dither matrix in horizontal and vertical scanning directions, and binarizing the gray level of each pixel with each threshold value as a basis. The error-diffusing method is a method in which pseudo level representation is performed on recording paper, by scanning a multi-level image signal in horizontal and vertical scanning directions, propagating binary errors occurring in the surrounding pixels of a target pixel to the target pixel at a preset rate, and binarizing the image signal of the relocated target pixel.

The simple binarizing method is a method effective for an image, in which the contrast of characters, line drawings, etc., should be enhanced, because the method has the effect of putting black; pixels together at a portion where a change in the gray-level gradient is sharp. However, for an image with a smooth change in a gray-level gradient and a weak contrast, such as a photograph, etc., this method is not suitable to binarize a photograph image signal, etc., as it damages image information having a smooth change in a gray-level gradient.

On the other hand, the binarizing method, employing a pseudo halftone process which is performed by a dither method or error-diffusing method, is a method effective for an image with a weak contrast such as a photograph, etc., since it gives a smooth pseudo representation to a region where a change in a gray-level gradient is small. However, in an image with strong contrast, which is required to concentrate black pixels at a portion where a change in a gray-level gradient is sharp, such as a character, a line drawing, etc., this method is not suitable to binarize a character image signal, etc., because it gives rise to a white pixel (black pixel except inside) at a character portion (which should originally be a black pixel), etc., also reduces character sharpness, and causes a fine character which have lost its shape.

Therefore, in the process of binarizing an image signal obtained by reading, if the print of a black-and-white manuscript where characters, photographs, netted points, etc., are present together is to be obtained, it is preferable that for a region, represented mainly by two values, which is constituted of characters, tables, line drawings and the like (hereinafter referred to as a character region), binarization be performed by the simple binarization method and it is preferable that for a region, which can represent a halftone, such as a silver-salt photograph region, a netted-point image region and the like (hereinafter referred to as a halftone region), binarization be performed by a dithering method or error-diffusing method. As described above, for one frame amount of read image signals corresponding to the amount of a manuscript sheet, a technique for accurately discriminating a character region and a halftone region and performing optimum binarization for each region becomes necessary in order to neatly print a manuscript where characters, photographs, line drawings, etc., are present together. In addition, in a silver-salt photograph and a photograph of a net-pointed manuscript, if binarization such as netted-point processing, etc., is performed on the net-pointed manuscript, the problem of easy occurrence of Moire fringes, etc., will arise. Therefore, it is not preferable to simply perform the same binarization on both a silver-salt photograph and a photograph of a net-pointed manuscript. From such a point, it also becomes necessary to accurately discriminate regions of a character, a photograph, and netted points from the read manuscript information and perform optimum binarization according to the region type of a manuscript image.

Note that in stencil printers, a binarizing process according to the type of output unit as well as the discrimination of regions in a manuscript is necessary, for the following reasons: as a dot gain is great, image destruction is liable to occur; and if the same binarizing process is performed, an image darker in its entirety than ordinary printers will be printed out; and therefore, if binarization is simply performed, for example, on a halftone region by the error-diffusing method, reproduction of a clear image cannot be performed.

On the other hand, at present, embedding color photograph images as well as black-and-white photograph images, as is generally known, is possible. Also, in photogravure, etc., color net-pointed manuscripts are sometimes employed as manuscripts for printing. Thus, the rate at which a color manuscript is employed in printing has become higher than that for a black-and-white manuscript.

In the case where a black-and-white image is printed by the use of a color manuscript, a black-and-white print can be obtained in a manner known in the prior art, by reading the color manuscript with a monochrome scanner, obtaining a multi-level image signal representing only the brightness (gray level) information in the color image corresponding to the black-and-white image information, binarizing this multi-level image signal, and obtaining binary output, based on the binarized image data.

However, in such a simple method, only the brightness information in a color image is extracted and the hue information and saturation information cannot be utilized in performing region discrimination or binarization. Because of this, a black character, for example, is discriminated as a character and printed properly, while a light red character is discriminated as a photograph, not as a character. As a result, a phenomenon of a printed character becoming blurred, etc., will arise. In this case, a more appropriate printout can be obtained, by adjusting the gain of a multi-level image signal, or parameters that are employed in performing region discrimination or binarization. However, although a light red character becomes appropriate, the other regions conversely become inappropriate. Thus, adjustments cannot always be made so that an appropriate printout is obtained for all regions.

There is a method in which only specific color information is detected by employing a color conversion filter on a monochrome scanner and color classification is performed by the use of representation such as netting, etc. This method, however, is not effective and can perform only graph classification.

There is another method in which a black-and-white print is obtained by reading a color manuscript with a color scanner; obtaining, for example, multi-level color image signals carrying red (R) information, green (G) information, and blue (B) information; converting the three multi-level image signals to a single multi-level image signal (luminance signal) representing monochrome image information by the use of a known equation of Y=0.3R+0.6G+0.1B; binarizing this converted multi-level image signal; and obtaining binary output, based on the binarized image data.

According to this method, at least each color information about R, G, and B can be reflected on monochrome-image information. In addition, color adjustments are made by adjusting, for example, the gain of a desired color in each of the multi-level image signals for R, G, and B, and the result can be reflected as gray adjustments on a monochrome print. Therefore, it is conceivable to make adjustments so that a light read character portion is properly printed without having influence on the other portions.

However, the RGB color space represented by each color information about R, G, and B is not necessarily coincident with human color sensation, and there is a problem that the gray adjustments as a result of adjustments to the gains of R, G, and B will not always be appropriate. For instance, it is not entirely impossible but is substantially difficult to adjust a gray state on a print, which represents a dark and dull flesh color, to a desired gray state such as a gray state representing a light and vivid flesh color, etc., by gain adjustments to R, G, and B.

For example, even if a color image signal read by a color scanner is converted to a monochrome signal by the above-mentioned equation, it will not represent a desired hue (change in a gray level) such as the skin of a human being, the blue of the sky, the green of trees and plants, etc., called memorized colors of persons.

There has been provided no simple method in which a color manuscript is converted to appropriate gray-level information (brightness information and gray information) and printed as a black-and-white image.

SUMMARY OF THE INVENTION

In view of the foregoing observations and description, the primary object of the present invention is to provide a black-and-white image printing method and a black-and-white image printing apparatus which are capable of converting a color manuscript to appropriate gray-level information and performing the adjustment in conformity to human color sensation.

The black-and-white image printing method and the black-and-white image printing apparatus according to the present invention are characterized in that at least either brightness or saturation is independently controlled for each desired hue and that this result of control is reflected on black-and-white printing as gray-level information.

That is, in the black-and-white image printing method according to the present invention, color image information is converted to black-and-white image information and a black-and-white printout is obtained based on the converted black-and-white image information. At least either brightness or saturation is independently controlled for each desired hue, based on a color image signal carrying the color image information. The controlled color image signal is converted to a black-and-white image signal carrying the black-and-white image information, and the black-and-white printout is obtained based on the converted black-and-white image signal.

It is preferable that the color image signal, which is a control object, be an image signal represented in an LHC color space, "Lab" color space, or "Luv" color space. The "Lab" color space refers to an L*a*b color space, and the "Luv" color space refers to an L*u*v color space.

In a preferred form of the above-mentioned black-and-white image printing method according to the present invention, gray-level control conforming to a desired color is further performed with respect to a black-and-white image signal obtained based on a color image signal in which brightness and/or saturation have been controlled. Based on this black-and-white image signal in which the gray-level control has been performed, a black-and-white printout is obtained.

The black-and-white image printing apparatus according to the present invention comprises conversion means which converts color image information to black-and-white image information; printing means which obtains a black-and-white printout, based on the converted black-and-white image information; and control means which independently controls at least either brightness or saturation for each desirable hue, based on a color image signal carrying the color image information. The conversion means converts the color image signal, in which the brightness and/or saturation have been controlled, to a black-and-white image signal carrying the black-and-white image information, and the printing means obtains the black-and-white printout, based on the converted black-and-white image signal.

In the black-and-white image printing apparatus according to the present invention, it is preferable that the control means use an image signal, represented in any color space among an LHC color space, an "Lab" color space, and an "Luv" color space, as the color image signal.

In a preferred form of the present invention, the black-and-white image printing apparatus further includes gray-level control means which performs gray-level control conforming to a desired color on a black-and-white image signal obtained by converting the color image signal in which brightness and/or saturation have been controlled. In this case, the control means obtains a black-and-white printout, based on the black-and-white image signal in which the gray-level control has been performed.

In accordance with the black-and-white image printing method and apparatus according to the present invention, at least either brightness or saturation is independently controlled for each desired hue, and the controlled color image signal is converted to a black-and-white image signal to obtain a black-and-white printout. Therefore, it becomes possible to independently adjust the hue, brightness, and saturation of color information in conformity to human color sensation and reflect the result of adjustment as a variation in the gray level of a printed image. Consequently, black-and-white printing can be performed with gray-level adjustments conforming to human color sensation.

For instance, if desired hues are selected from the color image information read through a color scanner, brightness or saturation is adjusted for each of the selected hues, the color information after adjustment is converted to monochrome information and binarized, and black-and-white printing is performed, then gray-level adjustments in conformity to human color sensation can be made on the printed black-and-white image as a result.

BRIEF DESCRIPTION OF THE DRAWINGS

The present invention will be described in further detail with reference to the accompanying drawings wherein:

FIG. 1 is a block diagram showing the construction of a black-and-white image printing apparatus;

DESCRIPTION OF THE PREFERRED EMBODIMENT

Figure 2:
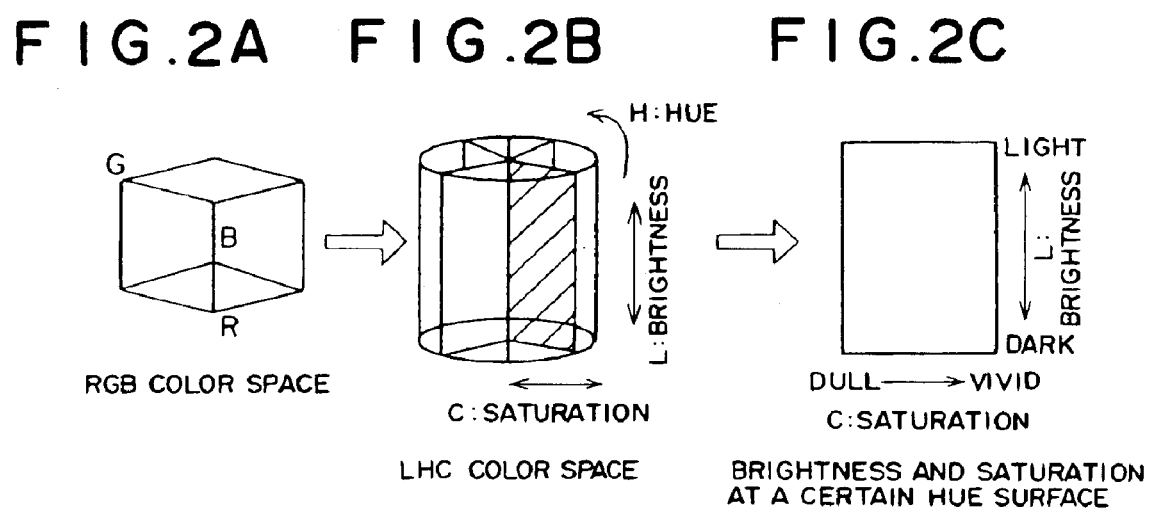
FIGS. 2A through 2C are diagrams showing an example of a conversion from one color space to another.

Referring to FIG. 1, there is shown a black-and-white image printing apparatus (also referred to simply as a printing apparatus) in accordance with a preferred embodiment of the present invention. This printing apparatus 1 comprises (1) an image input section 10 employing a color scanner; (2) a preprocessing section 20 consisting of a first-in first-out (FIFO) memory 21, RGB correction means 22, and an interlinear adjustment RAM 23; (3) a color space conversion section 30 consisting of color conversion means 31 which converts a multi-level color image signal in an RGB color space (which will hereinafter be referred to as an RGB signal, each color signal being represented by R, G, and B) to a multi-level color image signal in an LHC color space (which will hereinafter be referred to as an LHC signal, each color signal being represented by L, H, and C) and inverse color conversion means 32 which inversely converts the aforementioned color image signal in the LHC color space to the aforementioned color image signal in the RGB color space; (4) a color editing section 40 (control means in the present invention); (5) a monochrome conversion section 50 which converts the color image signal in the RGB color space, obtained after color adjustments, to a multi-level monochrome image signal Y; (6) a binarizing section 70 which binarizes the converted monochrome image signal Y; and (7) a printing section 80 which performs monochrome printing, based on the binarized image data.

The operation of the printing apparatus of the above-mentioned construction will be described in detail with reference to FIGS. 2 and 3.

A point-sequence RGB signal in which a color manuscript is divided into color information about red (R), green (G), and blue (B) is obtained by the color scanner (not shown) of the image input section 10. This point-sequence RGB signal is temporarily stored in the FIFO memory 21 of the preprocessing section 20. Then, R-pixel data, G-pixel data, and B-pixel data are sequentially read out in parallel from the FIFO memory 21 and converted to a simultaneous RGB signal equivalent to the amount of a sheet manuscript. This simultaneous RGB signal is input to the RGB correction means 22, in which color scanner correction, such as γ-correction, etc., is performed. Next, the simultaneous RGB signal is input to the interlinear adjustment RAM 23, in which a pixel value between lines is corrected. After this sequence of preprocessing operations, the RGB signal is input to the color conversion means 31.

Figure 3:
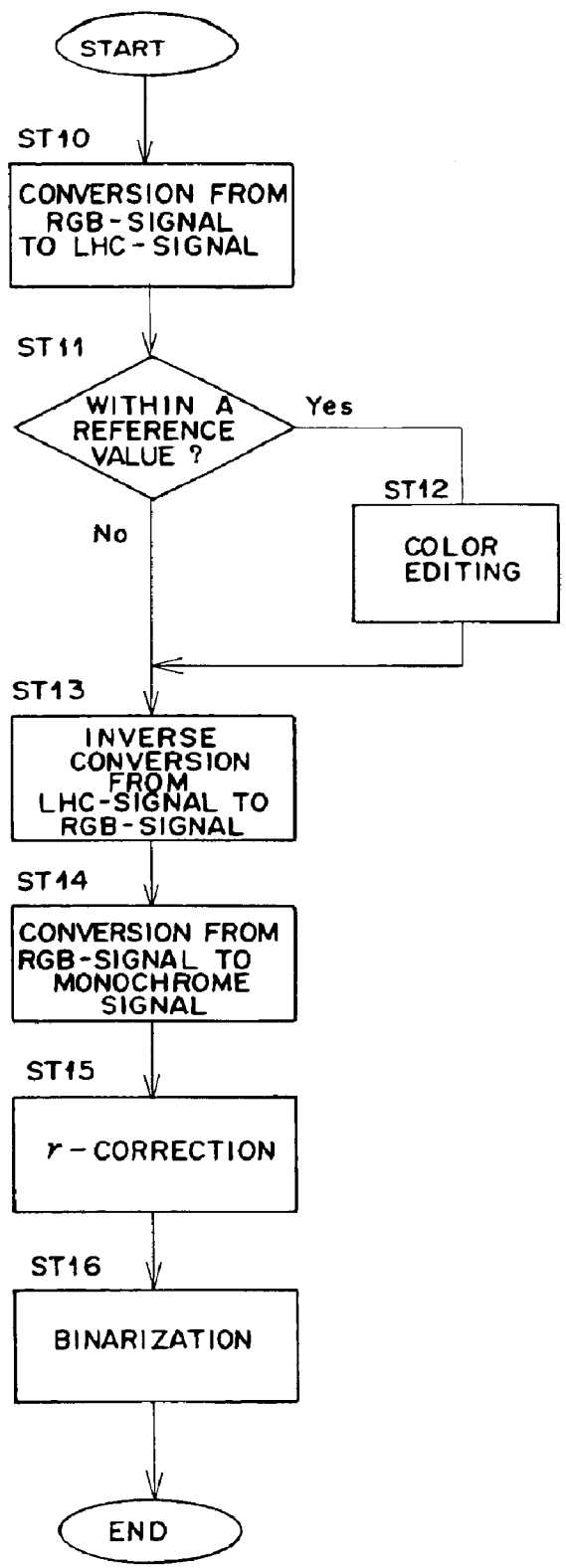
FIG. 3 is a flowchart showing a color-editing process.

In the color conversion means 31, the RGB signal which is a color image signal in the RGB color space is converted to an LHC signal which is a color image signal in the LHC color space close to human color sensation, as shown in FIG. 2 (step ST10). Here, "L" denotes brightness information, "H" hue information, and "C" saturation information. In performing this color conversion, the RGB signal is converted to the LHC signal for each pixel. Since this color conversion is well known in the prior art, a description thereof is not given.

For example, in the case where L (brightness) and C (saturation) are represented by 0 to 99, they can be represented by 100 levels: 0 (dark) to 99 (light) for L and 0 (dull) to 99 (vivid) for C. Also, H (hue) can be represented by an angle of 360 degrees from 0 to 359. For instance, color classification can be performed in 360 levels: 0 to 59 for red to yellow; 60 to 119 for yellow to green; 120 to 179 for green to light blue; 180 to 239 for light blue to blue; 240 to 299 for blue to purple; and 300 to 359 for purple to red.

The converted LHC signal is input to the color editing section 40. Information on color editing (color adjustment) is input from an operator to the color editing section 40 as a color-editing signal. The color-editing signal contains information on a color to be edited, enhancement, deletion, hue conversion, etc.

In the color editing section 40, a hue surface corresponding to the input color-editing signal is selected by judgement based on a reference value (step ST11). That is, from the hue divided into 360 levels, as described above, flesh color, for example, is defined as being between 20 and 45, and when a RGB signal is converted to an LHC signal, the value of the H-signal is compared with a reference value representing a desired hue (e.g., 20 to 0.45 for flesh color), whereby it is judged whether or not the value of the H-signal is the desired value. Thus, by defining a color of representation, which is specified by angles, as a reference value, a hue surface indicated by oblique lines in the LHC color space shown in FIG. 2B, for example, can be selected. The selected hue surface is constituted of L-information (brightness: dark to light) and C-information (saturation: dull to vivid), as shown in FIG. 2C.

Next, in the selected hue surface, color editing is performed based on the input color-editing signal (step ST12). More specifically, adjustments to hue (C), brightness (L), and saturation (C) are made by varying each value of the LHC signal. Here, color enhancement can be adjusted by varying a value of saturation (C), color conversion by varying a value of hue (H), and deletion by making values of brightness (L) and saturation (C) zero.

For example, when the color-editing signal indicates "enhancing green," the hue surface of green in the LHC color space is selected and the value of the saturation C of this hue surface of green is made greater. Also, when it indicates "deleting red," the red information is deleted by selecting the hue surface of red in the LHC color space and making the values of brightness L and saturation C of this hue surface of red zero. In addition, when adjusting the flesh color of a person, a plurality of hue surfaces corresponding to the flesh color are selected and the values of the brightness L and saturation C of the hue surfaces are varied.

Thus, by making color adjustments in the LHC color space conforming to human color sensation, values of hue C, brightness L, and saturation C can be adjusted independently of one another and therefore the expressional image of a person, for example, can have variations. For instance, when a manuscript is a scenic image, a more desirable color tone can be obtained by adjusting the blue of the sky or the green of trees and plants. In addition, when a manuscript is an item of food an expression of fresh food material becomes possible by adjusting red or green, and when a manuscript is a precious stone a more vivid feeling of precious stone can be obtained by adjustments to black and white, etc.

The LHC signal on which the color-editing process has been performed by the color-editing section 40 is input to the inverse color conversion means 32 and is inversely converted to an RGB signal in the RGB color space (step S13). With this inverse conversion, the RGB signal in which color adjustments have been made in conformity to human color sensation is obtained. The inverse color conversion, as with the color conversion in the above-mentioned color conversion means 31, can be performed by a known method and therefore a description thereof is omitted.

The RGB signal inversely converted by the inverse color conversion means 32 is input to the monochrome conversion section 50, in which the RGB signal is converted to a monochrome signal Y by a general conversion equation, Y=0.3R+0.6G+0.1B (step ST14). Note that another conversion equation may be employed.

With the above-mentioned conversion, the result of color adjustments in conformity to human color sensation can be appropriately reflected in the monochrome signal Y, i.e., gray-level information. In other words, gray-level adjustments corresponding to taste can be performed in conformity to human color sensation. The converted monochrome signal Y is input to a gray-level control section (not shown), in which a gamma (γ) correction process corresponding to the type of printing section 80 is performed (step ST15).

The monochrome signal Y on which the γ-correction process has been performed is input to the binarizing section 70, in which the signal Y is binarized to either 0 or 1 by a pseudo gray-level process (e.g., error diffusion, dithering, etc.) (step ST16). It is preferable that the image information be distinguished into a character region, a photograph region, and a netted-point region and that appropriate binarization be performed on each of the distinguished regions. The binarized signal is input to the printing section 80, in which printing is performed based on the binarized signal.

Thus, color signals (RGB signal), obtained by reading a color manuscript, are converted to signals (LHC signal) where hue, saturation, and brightness are independent. In addition, the color signals are converted to the monochrome signal Y after arbitrary colors have been edited based on the signals representing hue, saturation, and brightness. Therefore, binarization and black-and-white printing full of variety become possible, compared with the case where the RGB signal is converted to the monochrome signal Y after adjustments have been made on the RGB signal.

In the foregoing description, by converting a color image signal in the RGB color space to a color image signal in the LHC color space and then performing the color-editing process in the LHC color space, color adjustments in conformity to human color sensation is made possible and this result of adjustment can be reflected in gray-level information. However, the present invention is not necessarily limited to the case where the color-editing process is performed in the LHC color space. The color-editing process may be performed in a color space, where hue, saturation, and brightness are independent, such as an L*a*b color space, an L*u*v color space, etc., so that color adjustments in conformity to human color sensation can be performed.

What is claimed is:

1. A printing method comprising the steps of:

converting a color image signal carrying color image information to a black-and-white image signal carrying black-and-white image information; and obtaining a black-and-white printout, based on the converted black-and-white image signal carrying the black-and-white information;

wherein at least either brightness level or saturation level of the color image information is independently changed for each hue level to be adjusted, to obtain the black and white image information.

2. The printing method as defined in claim 1 in which said color image signal is an image signal represented in any color space among an LHC color space, an "Lab" color space, and an "Luv" color space.

3. A printing apparatus comprising:

conversion means which converts a color image signal carrying color image information to a black-and-white image signal carrying black-and-white image information;

printing means which obtains a black-and-white printout, based on the converted black-and-white image signal carrying the black-and-white information; and control means which independently changes at least either brightness level or saturation level of the color image information for each hue level to be adjusted, to obtain the black and white image information.

4. The printing apparatus as defined in claim 3 in which said control means uses an image signal, represented in any color space among an LHC color space, an "Lab" color space, and an "Luv" color space, as said color image signal.

5. A printing method comprising the steps of:

converting color image information to black-and-white image information, said converting step further comprises:

converting an RGB color image signal to a LHC color image signal;

adjusting at least one of hue, brightness or saturation, wherein the adjustments to each of hue, brightness and saturation are independent of each other;

converting the adjusted LHC color image signal to an adjusted RGB color image signal; and converting the adjusted RGB signal to a black and white image signal carrying said black-and-white image information; and obtaining a black-and-white printout, based on the converted black-and-white image signal.

* * * * *